(12) United States Patent
Nanba

(10) Patent No.: US 6,351,338 B2
(45) Date of Patent: *Feb. 26, 2002

(54) IMAGE PICKUP OPTICAL SYSTEM

(75) Inventor: Norihiro Nanba, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/255,328

(22) Filed: Feb. 23, 1999

(30) Foreign Application Priority Data

Feb. 26, 1998 (JP) .............................. 10-062337

(51) Int. Cl.[7] .............................. G02B 5/04; G02B 27/14
(52) U.S. Cl. ........................ 359/834; 359/365; 359/431; 359/630
(58) Field of Search ................................. 359/362–367, 359/350–353, 358–361, 583–590, 618, 431, 627–640, 831–837; 348/342, 355, 357

(56) References Cited

U.S. PATENT DOCUMENTS

| 3,674,334 | A |   | 7/1972  | Offner |         |
|-----------|---|---|---------|--------|---------|
| 4,265,510 | A |   | 5/1981  | Cook   |         |
| 4,477,156 | A |   | 10/1984 | Gebelein et al. | |
| 4,571,036 | A |   | 2/1986  | Gebelein et al. | |
| 4,737,021 | A |   | 4/1988  | Korsch |         |
| 4,775,217 | A |   | 10/1988 | Ellis  |         |
| 4,812,030 | A |   | 3/1989  | Pinson |         |
| 4,993,818 | A |   | 2/1991  | Cook   |         |
| 5,063,586 | A |   | 11/1991 | Jewell et al. | |
| 5,181,145 | A | * | 1/1993  | Eden   | 359/366 |
| 5,402,269 | A | * | 3/1995  | Oono et al. | 359/837 |
| 5,452,126 | A | * | 9/1995  | Johnson | 359/407 |
| 5,715,023 | A | * | 2/1998  | Hoppe  | 359/630 |
| 5,768,024 | A | * | 6/1998  | Takahashi | 359/631 |
| 5,777,673 | A | * | 7/1998  | Yoshikawa | 359/634 |
| 6,014,261 | A | * | 1/2000  | Takahashi | 359/633 |
| 6,111,701 | A | * | 8/2000  | Brown  | 359/637 |

FOREIGN PATENT DOCUMENTS

| JP | 2-297516 | 12/1990 |
| JP | 5-12704  | 1/1993  |
| JP | 6-139612 | 5/1994  |
| JP | 8-292371 | 11/1996 |

* cited by examiner

*Primary Examiner*—Thong Nguyen
(74) *Attorney, Agent, or Firm*—Fitzpatrick, Cella, Harper & Scinto

(57) ABSTRACT

An image pickup optical system includes an optical unit having a light incidence surface on which a light is incident, a light reflecting surface reflecting the light incident from the light incidence surface and having a curvature, and a light emergence surface from which the light reflected by the light reflecting surface emerges, and a transparent optical member disposed near the surface position of at least one of the light incidence surface and the light emergence surface. The optical member is adhesively fixed to the optical unit to thereby make any special holding member for the optical member relative to the optical unit unnecessary.

11 Claims, 8 Drawing Sheets

IMAGE PICKUP OPTICAL SYSTEM

BACKGROUND OF THE INVENTION

1. Field of the Invention

This invention relates to an optical unit and an optical system using the same, and particularly is suitable for a video camera or a still video camera and a copying apparatus or the like utilizing an optical unit comprising a plurality of reflecting surfaces each having a curvature constructed integrally with one another.

2. Related Background Art

There have heretofore been proposed various photographing optical systems utilizing the reflecting surface of a concave mirror, a convex mirror or the like. FIG. 6 of the accompanying drawings is a schematic view of the essential portions of a so-called mirror optical system (reflecting optical system) comprising a concave mirror and a convex mirror.

In the mirror optical system of FIG. 6, an object light beam 124 from an object is reflected by a concave mirror 121 and travels toward the object side while being converged, and is reflected by a convex mirror 122, whereafter it is imaged on an image plane 123.

This mirror optical system is based on the construction of a so-called Cassegrainian reflector, and is directed to shorten the full length of the optical system by bending the optical path of a telephoto lens system of a great full lens length comprised of a refracting lens by the use of two reflecting mirrors opposed to each other.

Also in an objective lens system constituting a telescope, for a similar reason, there are known a number of systems for shortening the full length of the optical system by the use of a plurality of reflecting mirrors, besides the Cassegrainian type.

As described above, by using a reflecting mirror instead of the lens of a photo-taking lens of a great full lens length, the optical path is efficiently bent to thereby provide a compact mirror optical system.

Generally, however, in a mirror optical system such as a Cassegrainian reflector, there is the problem that a part of the object ray of light is eclipsed by the convex mirror 122. This problem is attributable to the fact that the convex mirror 122 is present in the passage area of the object light beam 124.

In order to solve this problem, there has also been proposed a mirror optical system in which a reflecting mirror is made eccentric and used to avoid the other portion of the optical system shielding the passage area of the object light beam 124, i.e., separate the principal ray 126 of the light beam from an optical axis 125.

FIG. 7 of the accompanying drawings is a schematic view of the essential portions of a mirror optical system disclosed in U.S. Pat. No. 3,674,334, and this mirror optical system separates the principal ray of an object light beam from an optical axis to thereby solve the above-noted problem of eclipse. The mirror optical system of FIG. 7 has, in the order of passage of the light beam, a concave mirror 131, a concave mirror 133, and they are originally reflecting mirrors rotation-symmetrical with respect to an optical axis 134, as indicated by dot-and-dash lines in FIG. 7. Of these mirrors, use is made of only the upper side of the concave mirror 131 relative to the optical axis 134 as viewed in the plane of the drawing sheet, only the lower side of the convex mirror 132 relative to the optical axis 134 as viewed in the plane of the drawing sheet, and only the lower side of the convex mirror 133 relative to the optical axis 134 as viewed in the plane of the drawing sheet to thereby construct an optical system in which the principal ray 136 of the object light beam 135 is separated from the optical axis 134. This eliminates the eclipse of the object light beam 135.

FIG. 8 of the accompanying drawings is a schematic view of the essential portions of a mirror optical system disclosed in U.S. Pat. No. 5,063,586. The mirror optical system of FIG. 8 solves the above-noted problem by making the central axis itself of a reflecting mirror eccentric relative to an optical axis and separating the principal ray of an object light beam from the optical axis.

When in FIG. 8, the vertical axis of an object surface 141 is defined as an optical axis 147, the central coordinates of the respective reflecting surfaces of a convex mirror 142, a concave mirror 143, a convex mirror 144 and a concave mirror 145 in the order of passage of the light beam and the central axes (axes passing through the centers of the reflecting surfaces and the centers of curvature of those surfaces) 142A, 143A, 144A and 145A are decentering or eccentric relative to the optical axis 147. In FIG. 8, the amount of eccentricity at this time and the radius of curvature of each surface are appropriately set to thereby prevent the eclipse of the object light beam 148 by each reflecting mirror, and efficiently form an object image on an imaging plane 146.

Besides the aforementioned patents, U.S. Pat. No. 4,737,021 and U.S. Pat. No. 4,265,510 disclose a construction in which use is made of a part of a reflecting mirror rotation-symmetrical with respect to an optical axis to avoid eclipse, or a construction in which the central axis itself of a reflecting mirror is made eccentric relative to an optical axis to thereby avoid eclipse.

Now, as a catadioptric optical system using both of a reflecting mirror and a refracting lens and having a focal length changing function, there are, for example, the deep sky telescopes of U.S. Pat. No. 4,477,456 and U.S. Pat. No. 4,571,036. These use a parabolic reflecting mirror as a main mirror and use an Elfre eyepiece mirror to make the magnification variable.

Also, there is known the zooming technique of moving the plurality of reflecting surfaces constituting the above-described mirror optical system relative to one another to thereby vary the imaging magnification (focal length) of the photo-taking optical system. For example, in U.S. Pat. No. 4,812,030, in the construction of the Cassegrainian reflector shown in FIG. 6, there is disclosed the technique of varying the spacing from the concave mirror 121 to the convex mirror 122 and the spacing from the convex mirror 122 to the image plane 123 relative to each other to thereby effect the focal length change of the photo-taking optical system.

FIG. 9 of the accompanying drawings shows another embodiment disclosed in the same publication. In FIG. 9, an object light beam 158 from an object impinges on a first concave mirror 151 and is reflected by the surface thereof and becomes a convergent light beam and travels toward the object side. The convergent light beam impinges on a first convex mirror 152, by which it is reflected toward the imaging plane side and becomes a substantially parallel light beam (and parallel to the optical axis 159) and impinges on a second convex mirror 154, and is reflected by the surface thereof and becomes a divergent light beam impinges on a second concave mirror 155, by which it is reflected and becomes a convergent light beam and is imaged on an image plane 157. In this construction, the spacing 153 between the first concave mirror 151 and the first convex mirror 152 is varied and also the spacing 156 between the second convex mirror 154 and the second concave mirror 155 is varied to thereby effect zooming and vary the focal length of the entire mirror optical system.

Also, in U.S. Pat. No. 4,993,818, the image formed by the Cassegrainian reflector shown in FIG. 6 is secondarily formed by another mirror optical system provided at the subsequent stage, and the imaging magnification of this mirror optical system for secondary imaging is varied to thereby effect the focal length change of the entire phototaking system.

These photo-taking optical systems of the reflection type have many required constituents, and to obtain the necessary optical performance, it has been necessary to assemble respective optical parts with good accuracy. Particularly, the accuracy of the quickly retracted positions of the reflecting mirrors is severe and therefore, the adjustment of the position and angle of each reflecting mirror has been requisite.

As a method of solving this problem, there has been proposed a method of making, for example, the mirror system into a block to thereby avoid the incorporation errors of the optical parts caused during the assembly thereof.

As prisms in which a number of reflecting surfaces are made into a block, there have heretofore been optical prisms such as a pentagonal roof prism, an optical prism such as a porro prism used in the finder system of a camera, and a color resolving prism for resolving a light beam from a photo-taking lens into three color lights, e.g., red, green and blue lights, and imaging object images based on the respective color lights on the surfaces of corresponding image pickup elements.

These prisms have a plurality of reflecting surfaces molded integrally with one another and therefore, the relative positional relation among the reflecting surfaces is made accurately and the positional adjustment among the reflecting surfaces becomes unnecessary. However, the main function of these prisms is to change the direction of travel of rays of light to thereby effect the reversal of an image, and each reflecting surface is formed by a flat surface.

In contrast, there is also known an optical system in which the reflecting surface of a prism is given a curvature.

FIG. 10 of the accompanying drawings is a schematic view of the essential portions of an observation optical system disclosed in U.S. Pat. No. 4,775,217. This observation optical system is an optical system through which an outside scene is observed and also a display image displayed on an information displaying member is observed in overlapping relationship with the scene.

In this observation optical system, a display light beam 165 emitted from a display image on the information displaying member 161 is reflected by a surface 162 and travels toward the object side, and impinges on a half mirror surface 163 comprising a concave surface. The light beam is reflected by this half mirror surface 163, whereafter the display light beam 165 is made into a substantially parallel light beam by the refractive power of the concave surface 163, and is refracted by and transmitted through the surface 162, whereafter it forms the enlarged virtual image of the display image and also enters an observer's pupil 164 to thereby make the observer recognize the display image.

On the other hand, an object light beam 166 from an object enters a surface 167 substantially parallel to the reflecting surface 162, and is refracted thereby and passes to the concave half mirror surface 163. Semi-transmitting film is deposited by evaporation on the concave surface 163, and a part of the object light beam 166 is transmitted through the concave surface 163, and is refracted by and transmitted through the surface 162, whereafter it enters the observer's pupil 164. Thereby, the observer visually confirms the display image in overlapping relationship with the outside scene.

FIG. 11 of the accompanying drawings is a schematic view of the essential portions of an observation optical system disclosed in Japanese Patent Application Laid-Open No. 2-297516. This observation optical system also is an optical system through which an outside scene is observed and a display image displayed on an information displaying member is observed in overlapping relationship with the scene.

In this observation optical system, a display light beam 174 emitted from the information displaying member 170 is transmitted through a flat surface 177 constituting a prism Pa and enters the prism Pa and impinges on a parabolic reflecting surface 171. The display light beam 174 is reflected by this reflecting surface 171 and becomes a convergent light beam and is imaged on a focal plane 176. At this time, the display light beam 174 reflected by the reflecting surface 171 has arrived at the focal plane 176 while being totally reflected between two parallel flat surfaces 177 and 178 constituting the prism Pa, whereby the thinning of the entire optical system is achieved.

The display light beam 174 emerging as a divergent light from the focal plane 176 then enters a half mirror 172 comprising a parabolic surface while being totally reflected between the flat surface 177 and the flat surface 178. Light beam 174 is reflected by half mirror surface 172 and at the same time, forms the enlarged virtual image of the display image by the refractive power thereof and becomes a substantially parallel light beam. Then, light beam 174 is transmitted through the surface 177 and enters an observer's pupil 173 to thereby make the observer recognize the display image.

On the other hand, an object light beam 175 from the outside is transmitted through a surface 178b constituting a prism Pb, and is transmitted through the half mirror 172 comprising a parabolic surface, and is transmitted through the surface 177 and enters the observer's pupil 173. The observer visually confirms the display image in overlapping relationship with the outside scene.

Further, optical heads for light pickup using an optical element having a surface of a prism made into a reflecting surface are disclosed, for example, in Japanese Patent Application Laid-Open No. 5-12704 and Japanese Patent Application Laid-Open No. 6-139612. These reflect a light from a semiconductor laser by a Fresnel surface or a hologram surface, and thereafter image it on a disc surface, and direct the reflected light from the disc to a detector.

Here, in any of the mirror optical systems having an eccentric mirror which are disclosed in the aforementioned U.S. Pat. No. 3,674,334, U.S. Pat. No. 5,063,586 and U.S. Pat. No. 4,265,510, each reflecting mirror is disposed with a different amount of eccentricity and the mounting structure for each reflecting mirror is very cumbersome and it is very difficult to secure mounting accuracy.

Also, in any of the photographing optical systems having the focal length changing function which are disclosed in U.S. Pat. No. 4,812,030 and U.S. Pat. No. 4,993,818, the number of constituent parts such as reflecting mirrors and an imaging lens is great, and to obtain necessary optical performance, it has been necessary to assemble the respective optical parts with good accuracy.

Also, particularly the accuracy of the relative position of the reflecting mirrors becomes severe and, therefore, it has been necessary to effect the adjustment of the position and angle of each reflecting mirror.

Also, the photographing optical system of the reflection type according to the prior art is of a construction suitable for a lens system of the so-called telephoto type in which the full length of the optical system is great and the angle of view is small. To provide a photographing optical system which requires the angle of view of a standard lens to the angle of view of a wide angle lens, the number of reflecting surfaces required in aberration correction becomes great and therefore, higher accuracy of parts and higher accuracy of assembly become necessary. This has led to a tendency toward a higher cost or the bulkiness of the whole system.

Also, the observation optical systems disclosed in the aforementioned U.S. Pat. No. 4,775,217 and Japanese Patent Application Laid-Open No. 2-297516 aim principally at the pupil imaging action for efficiently transmitting to the observer's pupil the display image displayed on the information displaying member disposed separately from the observer's pupil, and changing the direction of travel of rays of light. These publications do not directly disclose the technique of effecting positive aberration correction by a reflecting surface having a curvature. Also, the optical systems for light pickup disclosed in Japanese Patent Application Laid-Open No. 5-12704 and Japanese Patent Application Laid-Open No. 6-139612 are both restricted to the use of a detecting optical system, and have not satisfied the imaging performance for a photographing optical system, particularly an image pickup device using an image pickup element of the area type such as a CCD.

In contrast, the applicant of the basic application filed in Japan discloses in Japanese Patent Application Laid-Open No. 8-292371 describes an optical element in which a refracting surface on which a light beam is incident, a plurality of reflecting surfaces each having a curvature, and a refracting surface from which light beams reflected by these reflecting surfaces emerge are integrally molded on the surface of a transparent member, and an optical system using the same.

By using such an optical element, there is provided an optical system in which the compactness of an entire mirror optical system is achieved and yet the disposition accuracy (assembly accuracy) of a reflecting mirror liable to be in the mirror optical system is relaxed. Also, by adopting a construction in which a stop is disposed most adjacent to the object side of an optical system and an object image is formed at least once in the optical system, the shortening of the effective diameter of the optical system is achieved inspite of being an optical system having a wide angle of view. Appropriate refractive power is given to a plurality of reflecting surfaces constituting optical elements, and a reflecting surface constituting each optical element is eccentrically disposed to thereby provide an optical system in which the optical path is bent into a desired shape and of which the full length in a predetermined direction is shortened.

In the optical element proposed in the aforementioned Japanese Patent Application Laid-Open No. 8-292371, a method of holding other optical part such as an optical filter than an imaging optical system has not been particularly referred to.

SUMMARY OF THE INVENTION

It is an object of the present invention to provide an optical unit in which an incidence surface on which a light beam is refracted and incident, a plurality of reflecting surfaces each having a curvature for successively reflecting the incident light beam, and an emergence surface from which the light beam reflected by the plurality of reflecting surfaces is refracted and emerge are integrally formed on the surface of a transparent member, wherein an optical member such as an optical filter is adhesively secured to the incidence surface and/or the emergence surface, whereby any special holding member for the optical member is made unnecessary and the simplification of the entire device is achieved, and an optical system using the same.

It is also an object of the present invention to provide an optical system in which a solid state image pickup element is adhesively secured to the optical unit to thereby effect the positioning of the two, and any positional deviation after the manufacture of the optical system is prevented.

It is also an object of the present invention to provide an optical unit in which the area of contact of the optical effective portion of the optical member or the solid state image pickup element with the atmosphere is decreased to thereby reduce the influence of dust, and an optical system using the same.

The optical unit of the present invention is characterized in that an incidence surface on which a light beam is incident, a plurality of reflecting surfaces each having a curvature for successively reflecting the light beam from the incidence surface, and an emergence surface from which the light beam reflected by the plurality of reflecting surfaces emerges are integrally formed on the surface of a transparent member, and a light transmitting member is fixed near said the incidence surface and/or the emergence surface.

The optical unit of the present invention is particularly characterized in that the light transmitting member is adhesively fixed, another light transmitting member is adhesively fixed to the light transmitting member, the light transmitting member is adhesively fixed to the flat portion of the incidence surface and/or the emergence surface, the light transmitting member is an optical lowpass filter or an infrared cut filter, the another light transmitting member is cover glass covering the image pickup surface of the solid state image pickup element, and the light transmitting member is a prism having a reflecting surface.

The optical system of the present invention is characterized by at least one optical unit of the above-described construction.

DESCRIPTION OF THE PREFERRED EMBODIMENTS

In the optical system of the present embodiment, there is not a symmetry axis like an optical axis in a conventional optical system. So, a "reference axis" is set in the optical system and with this reference axis as the base, the construction of elements in the optical system will hereinafter be described.

The definition of the reference axis will first be described. Generally, the optical path of a certain ray of light of a reference wavelength which is the reference from the object plane to the image plane is defined as the "reference axis" in the optical system. By this alone, the ray of light which is the reference is not defined and therefore, usually the reference axis ray of light is set in conformity with the following two principles.

(1) When an axis having symmetry even partially exists in an optical system and the collection of aberrations can be effected with good symmetry, a ray of light passing on an axis having the symmetry is defined as a reference axis ray of light.

(2) When a symmetry axis generally does not exist in an optical system or when the collection of aberrations cannot be effected with good symmetry even if a symmetry axis exists partially, a ray of light emerging from the center of an object plane (the center of a range to be photographed and observed) and passing through the optical system in the order of the designated surfaces of the optical system and passing through the center of a stop in the optical system, or passing through the center of the stop in the optical system to the center of the last image plane is set as a reference axis ray of light, and the optical path thereof is defined as a reference axis.

Some embodiments of the optical system of the present invention will now be described.

Figure 1:
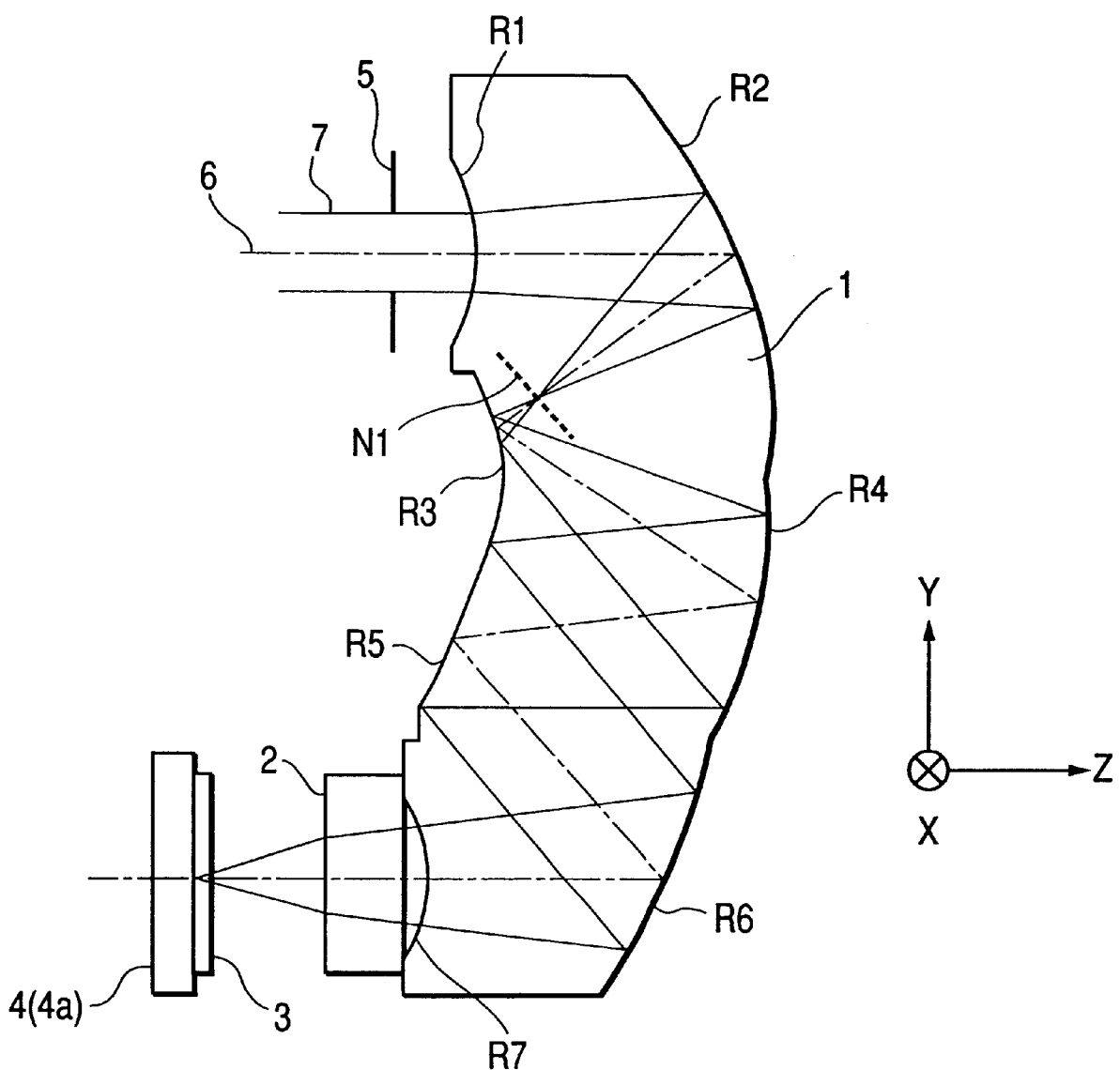
FIG. 1 shows the construction of an optical system according to embodiment 1 of the present invention.

FIG. 1 is a schematic view of the essential portions of Embodiment 1 of an optical system using the optical unit of the present invention. An optical path is also shown in FIG. 1. In FIG. 1, reference numeral 1 designates an off-axial optical unit provided with a plurality of curved reflecting surfaces and formed of a transparent material such as glass. The optical unit 1 includes, in the order of passage of a ray of light from an object, a refracting surface (incidence surface) R1 having negative refractive power and having its concave surface facing in the direction of travel of the light, five reflecting surfaces, i.e., a concave mirror R2, a convex mirror R3, a concave mirror R4, a convex mirror R5 and a concave mirror R6, and a refracting surface (emergence surface) R7 having negative refractive power and having its convex surface facing in the direction of travel of the light. Reference numeral 5 denotes a stop (entrance pupil) disposed on the object side of the optical unit 1.

Reference numeral 2 designates an optical correcting plate (light transmitting member) such as a low-pass filter (rock crystal plate) or an infrared cut filter adhesively fixed to the emergence surface R7 of the optical unit 1. Reference numeral 3 denotes cover glass covering a solid state image pickup element 4.

Reference character 4a designates the last image plane on which the image pickup surface of the image pickup element (image pickup medium) 4 such as a CCD is positioned. Reference numeral 6 denotes the reference axis of the present optical system which passes through the center of the stop 5 to the center of the last image plane 4a.

The reflecting surfaces R2 to R6 comprise off-axial reflecting surfaces so disposed as to be tilted with respect to the reference axis 6.

The two refracting surfaces R1 and R7 both comprise rotation-symmetrical spherical surfaces, aspherical surfaces or flat surfaces. Thereby, the condition for the correction of chromatic aberration is satisfied and the reference axis can be accurately set when the optical system is manufactured and evaluated. Also, the refracting surfaces are made rotation-symmetrical to thereby reduce the creation of asymmetrical chromatic aberration. Also, all the reflecting surfaces are surfaces symmetrical with respect to the YZ plane.

The two refracting surfaces R1 and R7 may be comprised of rotation-symmetrical surfaces, for example, an anamorphic aspherical surfaces.

The imaging action in the present embodiment will now be described. A light beam 7 from an object has its quantity of incident light regulated by the stop 5, whereafter it is refracted by and enters the incidence surface R1 of the optical unit 1, and is reflected by the surface R2, and thereafter is once imaged at the position N1 between the surface R2 and the surface R3, and then is reflected by the surfaces R3, R4, R5 and R6 in succession, and is refracted by and emerges from the emergence surface R7, and passes through the optical correcting plate 2 and the cover glass 3, and is re-imaged on the last image plane 4a of the image pickup element 4.

The light beam which has entered from the surface R1 as described above is intermediately imaged in the optical unit 1. Thereby, the optical system is made thin in a direction perpendicular to the plane of the drawing sheet of FIG. 1, and the off-axial principal ray of light which has emerged from the stop 5 is converged before it is greatly widened, and an increase in the effective diameter of each of the first reflecting surface R2 and subsequent surfaces by the wider angle of the optical system is suppressed.

The reference axis in the present embodiment is on the plane of the drawing sheet (YZ plane).

Thus, the optical unit 1 achieves desired optical performance by the incidence and emergence surfaces and the plurality of curved reflecting mirrors therein, and functions as a lens unit having the imaging action as a whole.

Each reflecting surface constituting the optical unit 1 is a so-called eccentric reflecting surface in which the normal at the point of intersection between the incident and emergent reference axis and the reflecting surface does not coincide with the reference axis. This prevents the eclipse occurring in the mirror optical system according to the prior art and also thereby constitutes a compact off-axial optical unit of a free shape which adopts a freer arrangement and is good in space efficiency.

Further, each reflecting surface is of a shape in which refractive power differs in two planes (yz plane and xz plane) orthogonal to each other and which has only one symmetrical surface. Thereby, the eccentric aberration caused by each reflecting surface being eccentrically disposed is suppressed.

In the optical unit 1 constituting the optical system of the present embodiment, the plurality of reflecting surfaces each having a curvature are constructed integrally with one another and therefore, a barrel for holding a plurality of lenses in an ordinary refracting optical system is unnecessary. Also, the construction shown in FIG. 1 is such that the entire optical system can be held if there are a holding member for the solid state image pickup element 4, a holding member for positioning the optical unit 1 relative to the image pickup surface of the solid state image pickup element 4 and a holding member for the stop 5.

Also, design is made such that the light beam having emerged from the optical unit 1 passes through the optical correcting plate and the cover glass 3 and thereafter, again forms an image on the image pickup surface of the solid state image pickup element 4, and the optical unit 1 at this time functions as a lens unit having desired optical performance and having the imaging action as a whole while repeating the reflection by the plurality of reflecting mirrors each having a curvature.

Figure 2:
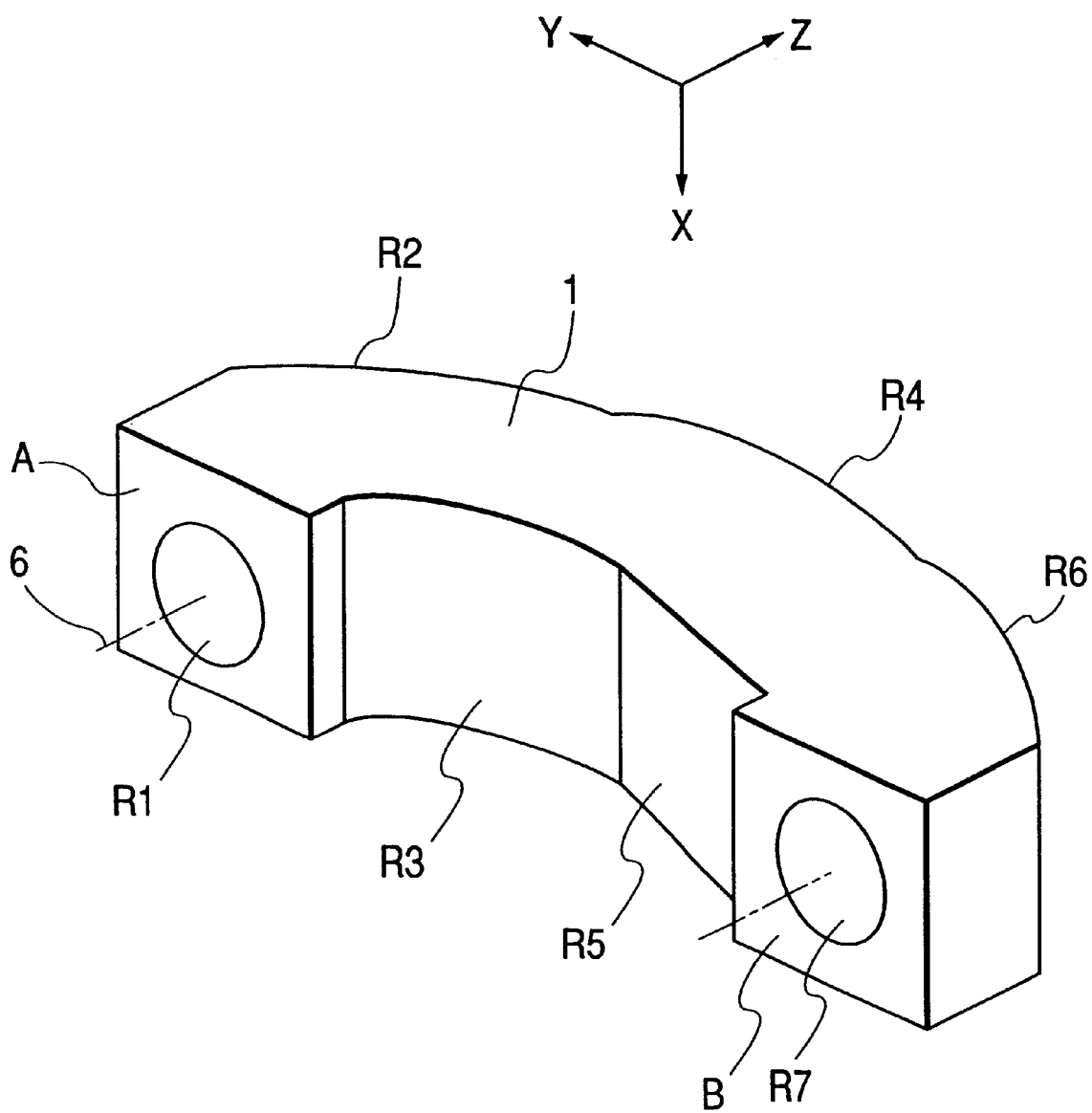
FIG. 2 is a perspective view showing the construction of the optical system according to Embodiment 1 of the present invention.

FIG. 2 is a perspective view of the optical unit shown in FIG. 1. In FIG. 2, the same reference characters as those in FIG. 1 designate the same parts. Also, in FIG. 2, the letter A designates a flat surface portion provided on the outer periphery of the incidence refracting surface R1, i.e., a location through which the effective light beam does not pass, and the letter B denotes a flat surface portion provided on the outer periphery of the emergence refracting surface R7. The flat surface portions A and B are basically surfaces perpendicular to the reference axis 6, and are formed on the surface of the optical unit 1 so that the flat surface portion A may be located on the object side from the refracting surface R1 and the flat surface portion B may be located on the image plane side from the refracting surface R7.

In the present embodiment, the optical correcting plate 2 is adhesively secured to the flat surface portion B located near the emergence refracting surface R7 of the optical unit 1. By doing so, a holding member for holding the optical correcting plate 2 is made unnecessary. Also, the simplification by the curtailment of the number of parts and the downsizing of the optical system by a decrease in volume corresponding to the absence of the holding member are made possible.

Also, the refracting surface R7 is hermetically sealed by the optical correcting plate 2, whereby the refracting surface R7 and that surface of the optical correcting plate 2 which is adjacent to the refracting surface R7 are shielded from the atmosphere, and the area of contact with the atmosphere in the optical unit 1 is decreased to thereby reduce the influence of dust on the optical system.

Figure 3:
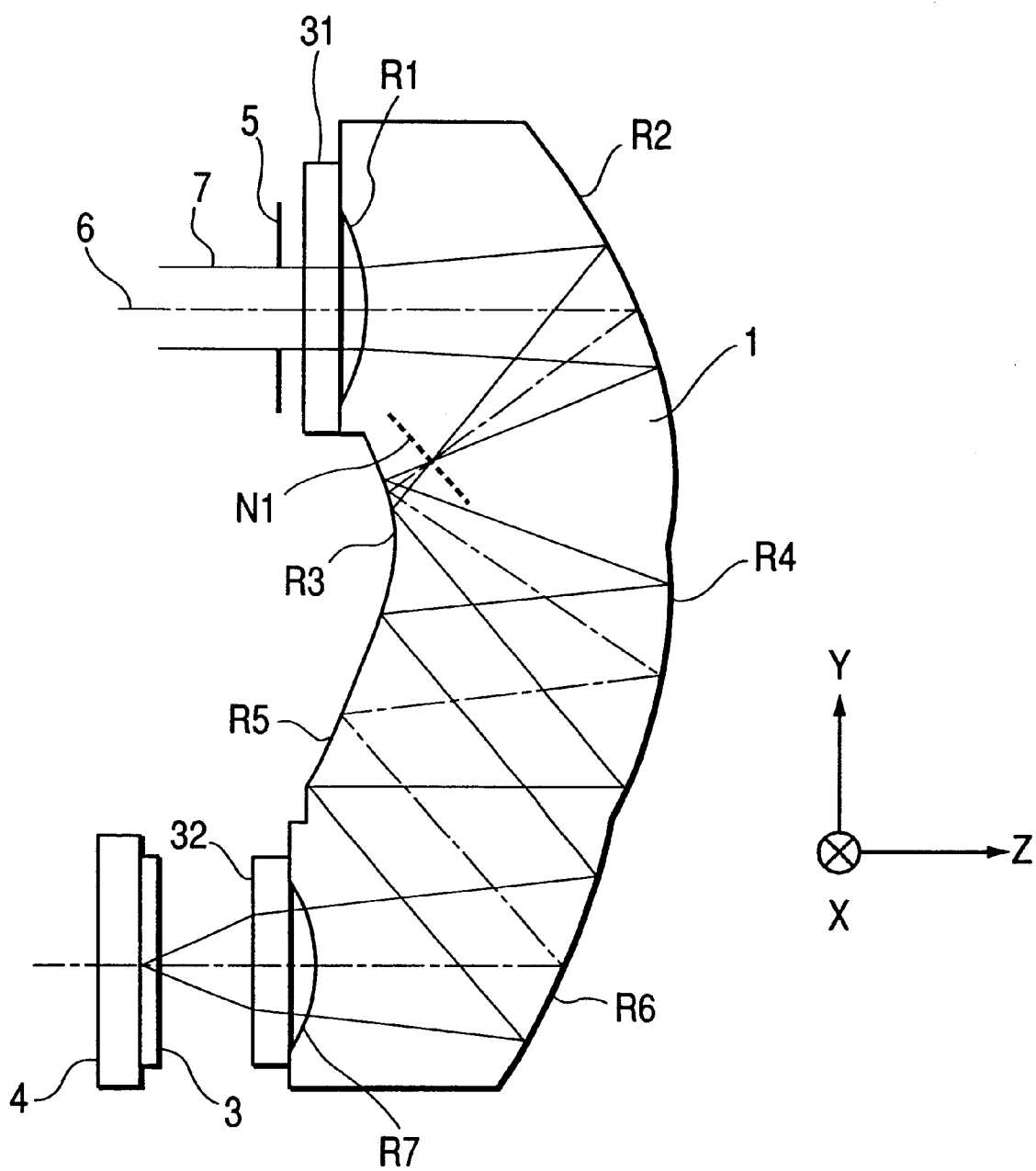
FIG. 3 shows the construction of an optical system according to embodiment 2 of the present invention.

FIG. 3 is a cross-sectional view of the essential portions of Embodiment 2 of the present invention. This embodiment differs from the Embodiment 1 of FIG. 1 only in that an optical correcting plate 31 such as an infrared cut filter is adhesively fixed to the incidence surface R1, and in the other points, the construction of this embodiment is the same as that of Embodiment 1.

Reference numeral 32 designates an optical low-pass filter. In the present embodiment, the optical correcting plate is adhesively secured divisionally to the incidence side and emergence side of the optical unit 1 to thereby make the thickness of the correcting plate on the emergence side small. Thereby, the optical design of the optical unit 1 more shortened in its back focal length is made possible. Generally, in a CCD, when light is incident on the image pickup surface thereof at a great angle of incidence, a problem such as color irregularity arises and therefore, it is required in an image pickup optical system for the exit pupil thereof to be made as far as possible from the image plane and telecentric. In the optical unit 1 shown in FIG. 3, when the exit pupil is equidistant from the image plane, it leads to the possibility of making the optically effective area of the concave mirror R6 which is the last reflecting surface smaller to shorten the back focal length. In the present embodiment, by so constructing, the thickness of the emergence side of the optical unit 1 in x direction is made small.

Figure 4:
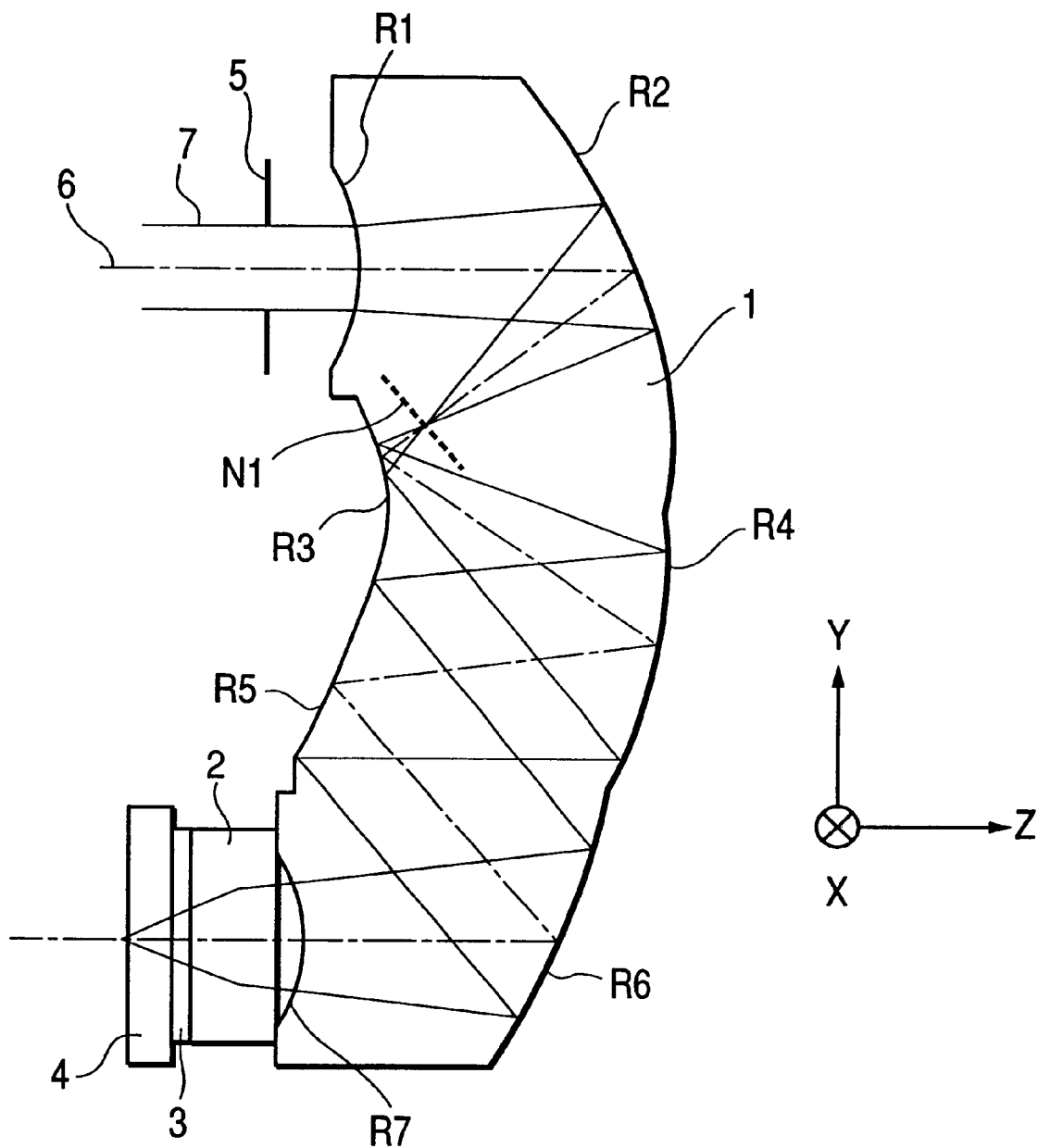
FIG. 4 shows the construction of an optical system according embodiment 3 of the present invention.

FIG. 4 is a cross-sectional view of the essential portions of Embodiment 3 of the present invention. This embodiment differs from the Embodiment 1 of FIG. 1 only in that the optical correcting plate 2 and the cover glass 3 protecting the image pickup element are adhesively fixed, and in the other points, the construction of this embodiment is the same as that of Embodiment 1.

In the present embodiment, the adherence of dust is completely prevented in such a manner that the optically effective portion near the imaging plane does not at all contact with air, thereby obtaining good images.

Also, in order to prevent the irregularity of the position of the image pickup surface relative to the mounted position of the solid state image pickup element in the direction of the reference axis, the focus adjustment of the optical system to be effected after the mounting of the solid state image pickup element is made unnecessary by using the surface of the cover glass as a mounting surface in the present embodiment, and also sufficiently controlling the accuracy of molding of the optical unit 1, the accuracy of the thickness and optical path length of the optical correcting plate 2, and the positional accuracy of the surface of the cover glass and the image pickup surface.

Figure 5:
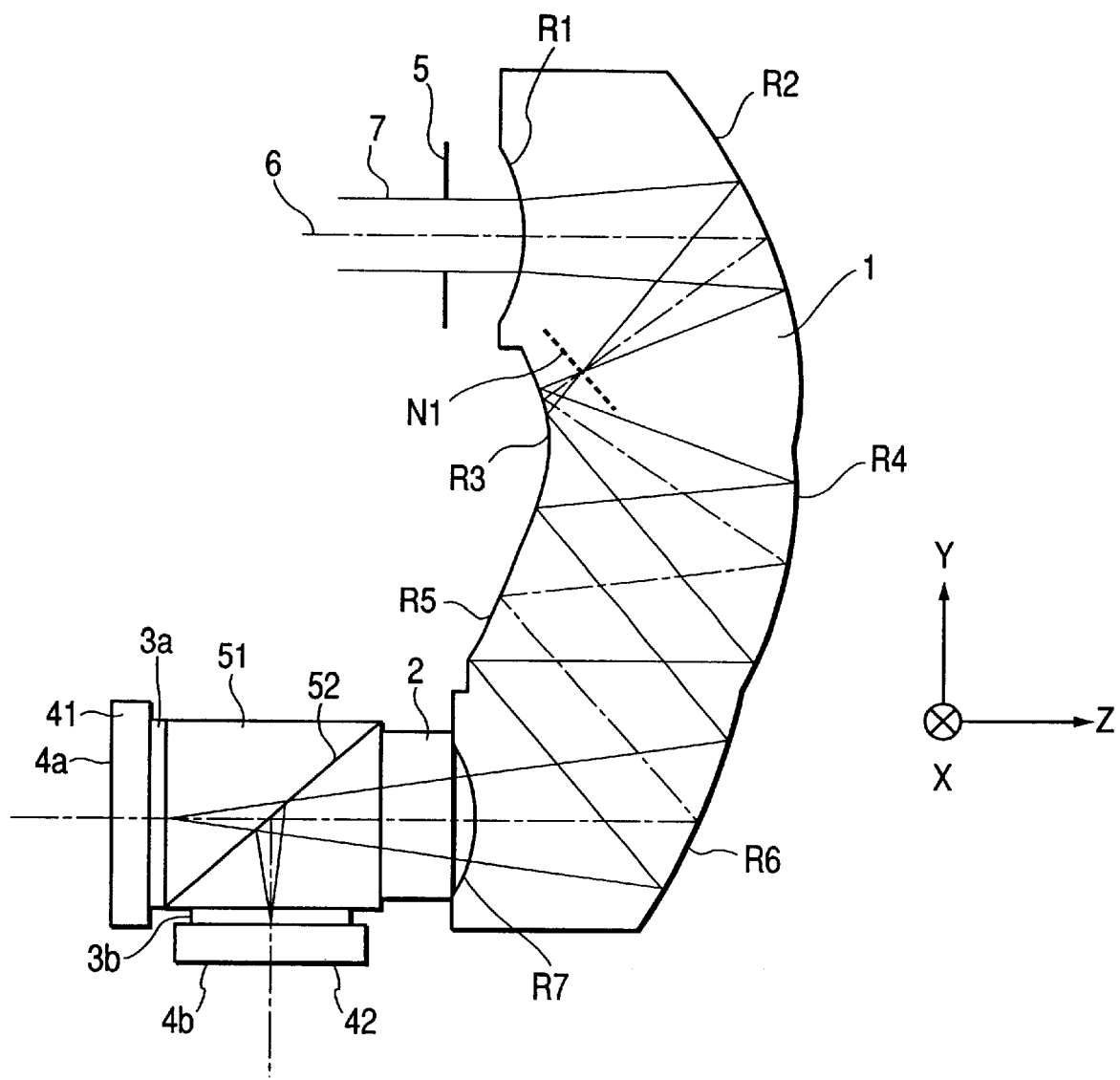
FIG. 5 shows the construction of an optical system according to the embodiment 4 of the present invention.
Figure 6:
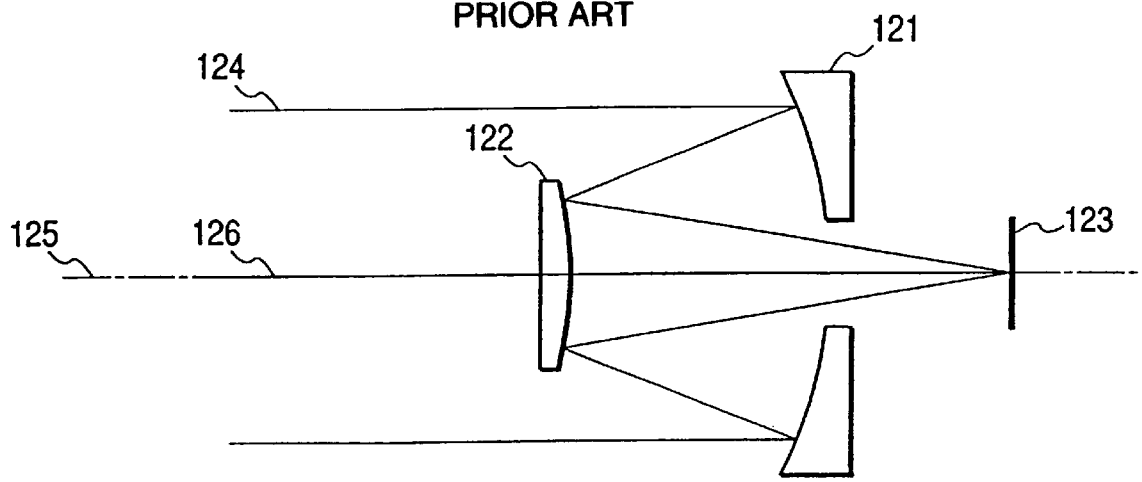
FIG. 6 shows the basic construction of a Cassegrainian reflector according to the prior art.
Figure 7:
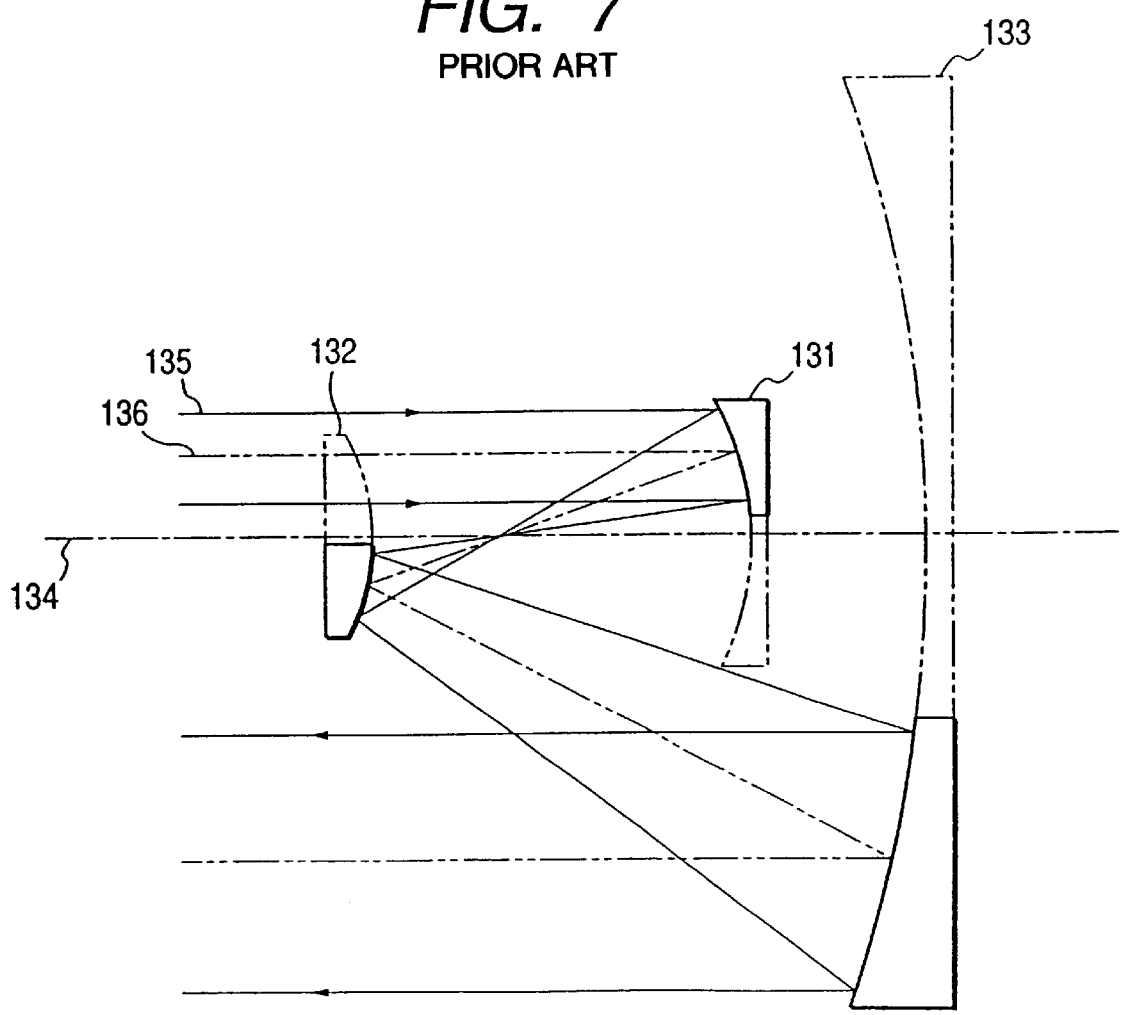
FIG. 7 is a schematic view of the essential portions of a mirror optical system according to the prior art.
Figure 8:
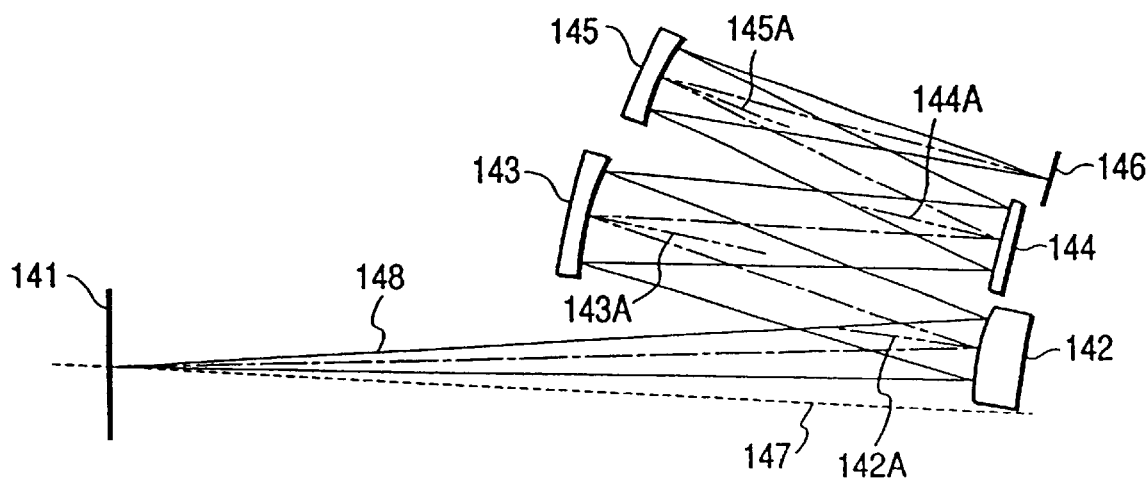
FIG. 8 is a schematic view of the essential portions of a mirror optical system according to the prior art.
Figure 9:
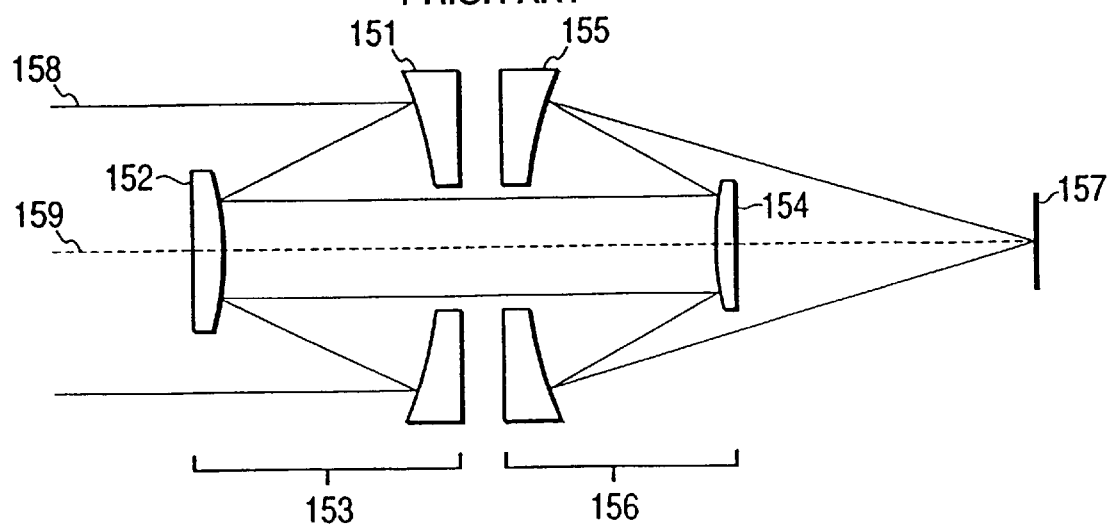
FIG. 9 is a schematic view of the essential portions of a mirror optical system according to the prior art.
Figure 10:
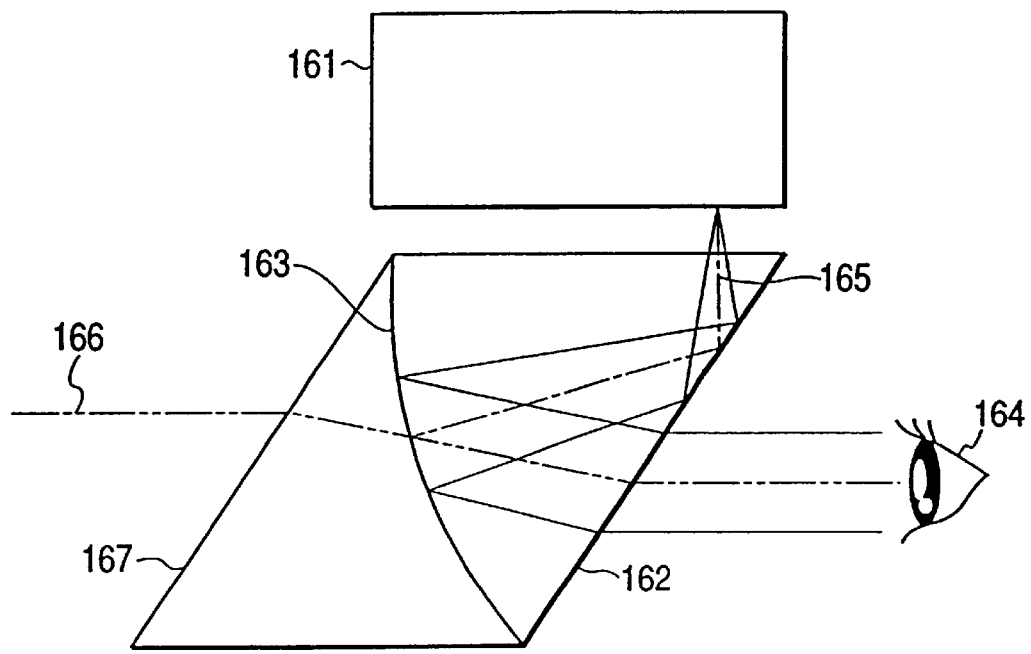
FIG. 10 is a schematic view of an observation optical system according to the prior art.
Figure 11:
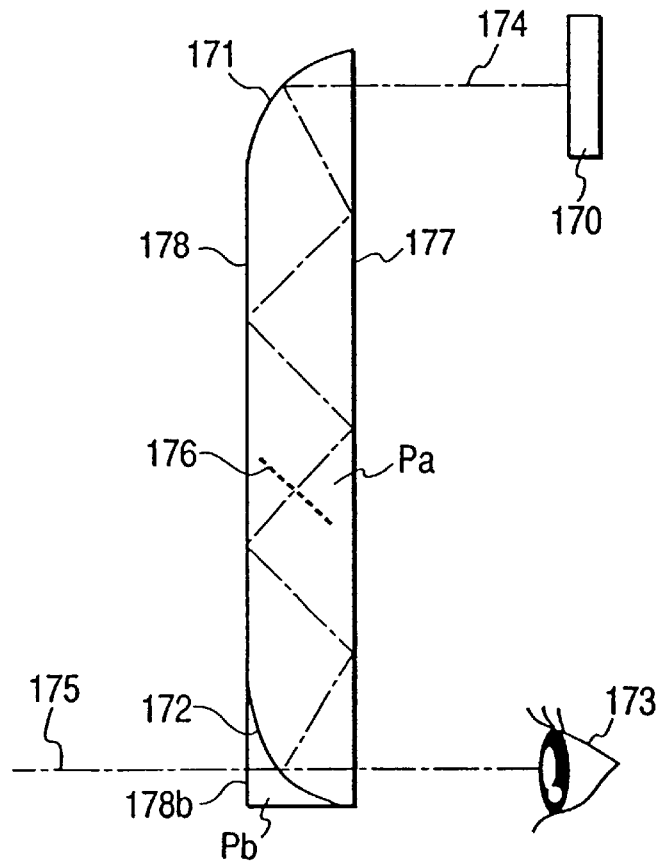
FIG. 11 is a schematic view of an observation optical system according to the prior art.

FIG. 5 is a cross-sectional view of the essential portions of Embodiment 4 of the present invention. This embodiment differs from the Embodiment 1 of FIG. 1 only in that two solid state image pickup elements 4a and 4b are provided for an optical unit 1 through a half mirror surface 52 and cover glasses 3a and 3b are provided for the optical correcting plate 2 and respective solid state image pickup elements 41 and 42, and in the other points, the construction of this embodiment is the same as that of Embodiment 1.

The cover glasses 3a and 3b are disposed while being adhesively secured to a beam splitter 51. The beam splitter 51 is of a construction in which two triangular prisms are joined together, and reference numeral 52 designates the joined surface. A half mirror coat is provided on the joined surface 52, and a light beam incident on the beam splitter 51 is separated into a transmitted light and a reflected light by the joined surface 52. The transmitted light passes through the cover glass 3a and forms an image on the image pickup surface 4a of the solid state image pickup element 41, and the reflected light passes through the cover glass 3b and forms an image on the image pickup surface 4b of the solid state image pickup element 41. Here, for example, the solid state image pickup elements 41 and 42 are in a positional relation wherein they deviate from each other by a half pixel pitch relative to the reference axis indicated by the dot-and-dash line, and the two images are combined together to thereby obtain an image of higher resolution than that by a single solid state image pickup element, by the so-called pixel deviating effect.

In the present embodiment, two solid state image pickup elements are adhesively secured to the beam splitter. Here, adjustment is done so as to provide the above-described positional relation during adhesive securing, whereafter the adhesive securing is effected to thereby ensure the accuracy of the amount of pixel deviation. Also, in the present embodiment, the optical members from the optical unit 1 to the solid state image pickup elements 41, 42 are all adhesively fixed to thereby prevent any positional deviation, any change in posture, etc. after the manufacture.

When the optical correcting plate 2 is unnecessary, the beam splitter 51 is adhesively secured to the optical unit 1. Also, the beam splitter may be a color resolving prism system using not only a half coat, but also a total reflection surface to obtain a similar effect.

According to the present invention, as described above, there can be achieved an optical unit in which an incidence surface on which a light beam is refracted and incident, a plurality of reflecting surfaces each having a curvature and reflecting the incident light beam in succession, and an emergence surface from which the light beam reflected by the plurality of reflecting surfaces is refracted and emerges are integrally formed on the surface of a transparent member, wherein an optical member such as an optical filter is adhesively secured to the incidence surface and/or said emergence surface to thereby make a holding member for the optical member unnecessary and achieve the simplification of the entire device, and an optical system using the same.

Besides this, according to the present invention, there can be provided an optical system in which a solid state image pickup element is adhesively secured to an off-axial optical unit, a prism or the like to thereby effect the positioning of the two and prevent any positional deviation after the manufacture.

Also, there can be provided an optical system in which the respective contact area of the optically effective portion of an off-axial optical unit, an optical correcting plate and a solid state image pickup element with air is decreased to thereby reduce the influence of dust.

What is claimed is:

1. An image pickup optical system comprising:
  an optical unit having a light incidence surface on which a light is incident, a light reflecting surface reflecting the incident light from said light incidence surface and having a curvature, and a light emergence surface from which the light reflected by said light reflecting surface emerges; and
  a transparent optical member which is cemented to an outer periphery of at least one of said light incidence surface and said light emergence surface of said optical unit, and, at portions other than the outer periphery, is spaced from said at least one surface,
    wherein respective portions of said transparent optical member and said optical unit cemented to each other are flat surfaces.

2. An image pickup optical system according to claim 1, wherein said optical unit comprises a plurality of light reflecting surfaces reflecting the light incident from said light incident surface.

3. An image pickup optical system according to claim 1, wherein said light emergence surface has negative refractive power, and said optical member is disposed rearwardly of said light emergence surface.

4. An image pickup optical system comprising:
  an optical unit having a light incidence surface on which a light is incident, a light reflecting surface reflecting the incident light from said light incidence surface and having a curvature, and a light emergence surface from which the light reflected by said light reflecting surface emerges; and
  a transparent optical low-pass filter which is fixed to an outer periphery of at least one of said light incidence surface and said light emergence surface of said optical unit, and, at portions other than the outer periphery, is spaced from said at least one surface.

5. An image pickup optical system comprising:
  an optical unit having a light incidence surface on which a light is incident, a light reflecting surface reflecting the incident light from said light incidence surface and having a curvature, and a light emergence surface from which the light reflected by said light reflecting surface emerges; and
  a transparent infrared cut filter which is fixed to an outer periphery of at least one of said light incidence surface and said light emergence surface of said optical unit, and, at portions other than the outer periphery, is spaced from said at least one surface.

6. An image pickup optical system comprising:
  an optical unit having a light incidence surface on which a light is incident, a light reflecting surface reflecting the incident light from said light incidence surface and having a curvature, and a light emergence surface from which the light reflected by said light reflecting surface emerges; and
  a transparent optical member which is fixed to an outer periphery of at least one of said light incidence surface and said light emergence surface of said optical unit, and, at portions other than the outer periphery, is spaced from said at least one surface,
    wherein said light incidence surface has a concave surface facing in the direction of travel of a light, and said optical member is disposed forwardly of said light incidence surface.

7. An image pickup optical system comprising:
  an optical unit having a light incidence surface on which a light is incident, a light reflecting surface reflecting the incident light from said light incidence surface and having a curvature, and a light emergence surface from which the light reflected by said light reflecting surface emerges; and
  a transparent optical member which is fixed to an outer periphery of at least one of said light incidence surface and said light emergence surface of said optical unit, and, at portions other than the outer periphery, is spaced from said at least one surface,
    wherein said transparent optical member is a prism having a reflecting surface reflecting the light.

8. An image pickup optical system according to claim 7, wherein the reflecting surface of said prism is a half mirror.

9. An image pickup optical system comprising:
  an optical unit having a light incidence surface on which a light is incident, a light reflecting surface reflecting the incident light from said light incidence surface and having a curvature, and a light emergence surface from which the light reflected by said light reflecting surface emerges; and
  a transparent optical member which is fixed to an outer periphery of at least one of said light incidence surface and said light emergence surface of said optical unit, and, at portions other than the outer periphery, is spaced from said at least one surface,
    wherein the light having emerged from said optical unit is converged and imaged, and an image pickup unit is disposed on an imaging plane.

10. An image pickup optical system according to claim 9, further comprising a cover glass, which is fixed between said image pickup unit and said optical member.

11. An optical system comprising:

a first optical unit having two refracting surfaces and a reflecting surface having a curvature, wherein light incident from one of said two refracting surfaces of said first optical unit emerges from the other refracting surface of said two refracting surfaces by way of said reflecting surface; and at least one additional optical unit which is cemented to an outer periphery of at least one of said two refracting surfaces, and, at portions other than the outer periphery, is spaced from said at least one refracting surface, and respective portions of said at least one additional optical unit and said first optical unit cemented to each other are flat surfaces.

* * * * *

UNITED STATES PATENT AND TRADEMARK OFFICE
CERTIFICATE OF CORRECTION

PATENT NO.    : 6,351,338 B2
DATED         : February 26, 2002
INVENTOR(S)   : Norihiro Nanba It is certified that error appears in the above-identified patent and that said Letters Patent is hereby corrected as shown below:

Column 2,
Line 24, "image.on" should read -- image on --.

Column 4,
Line 64, "particularly" should read -- in particular, --.

Column 5,
Line 47, "inspite" should read -- in spite --.

Column 6,
Line 2, "emergo" should read -- emerges --.
Line 27, "near said" should read -- near --.

Column 8,
Line 20, "an anamor-" should read -- anamor- --.

Signed and Sealed this

Thirtieth Day of July, 2002

Attest:

Attesting Officer

JAMES E. ROGAN
Director of the United States Patent and Trademark Office